United States Patent
Jang et al.

(10) Patent No.: US 7,708,451 B2
(45) Date of Patent: May 4, 2010

(54) BOTTOM FRAME FOR LIQUID CRYSTAL DISPLAY DEVICE, BACKLIGHT ASSEMBLY AND LIQUID CRYSTAL DISPLAY DEVICE USING THE SAME

(75) Inventors: Myong-Gi Jang, Seoul (KR); Hak-Mo Hwang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/452,369

(22) Filed: Jun. 14, 2006

(65) Prior Publication Data

US 2007/0002590 A1    Jan. 4, 2007

(30) Foreign Application Priority Data

Jun. 30, 2005    (KR) ............... 10-2005-0058138

(51) Int. Cl.
*F21V 7/04* (2006.01)

(52) U.S. Cl. .................. 362/633; 362/249.02; 362/612; 362/613; 362/632; 362/634; 349/58; 349/62; 349/63; 349/69; 349/75

(58) Field of Classification Search .................... 349/58, 349/62, 63, 69, 75, 93, 120, 181; 362/27–30, 362/240, 326, 565, 617, 632–634, 800, 217.1, 362/217.11–217.17, 249.01, 249.02, 612, 362/613
See application file for complete search history.

(56) References Cited

U.S. PATENT DOCUMENTS

| | | | |
|---|---|---|---|
| 4,573,766 A * | 3/1986 | Bournay et al. | 349/65 |
| 6,789,921 B1 | 9/2004 | Deloy et al. | |
| 7,086,753 B2 * | 8/2006 | Lin et al. | 362/225 |
| 2003/0030973 A1 * | 2/2003 | Kirchhevel et al. | 361/681 |
| 2004/0008512 A1 * | 1/2004 | Kim | 362/235 |
| 2004/0228107 A1 | 11/2004 | Lee et al. | |
| 2005/0007516 A1 | 1/2005 | Hong et al. | |
| 2005/0083711 A1 * | 4/2005 | Wu et al. | 362/558 |
| 2005/0231976 A1 * | 10/2005 | Keuper et al. | 362/600 |
| 2006/0104080 A1 * | 5/2006 | Kim et al. | 362/555 |
| 2006/0146531 A1 * | 7/2006 | Reo et al. | 362/244 |
| 2006/0146570 A1 * | 7/2006 | Park | 362/613 |
| 2006/0221611 A1 * | 10/2006 | Noh et al. | 362/247 |
| 2006/0279671 A1 * | 12/2006 | Han et al. | 349/61 |

FOREIGN PATENT DOCUMENTS

| | | |
|---|---|---|
| CN | 2594823 Y | 12/2003 |
| CN | 1591131 A | 3/2005 |

* cited by examiner

*Primary Examiner*—Sandra L O'Shea
*Assistant Examiner*—Mary Zettl
(74) *Attorney, Agent, or Firm*—Holland & Knight LLP

(57) ABSTRACT

A bottom frame for a liquid crystal display device includes a bottom surface, four side surfaces attached to the bottom surface, the four side surfaces along with the bottom surface define a space, first and second holes in two side surfaces, the first and second holes opposite to each other in two opposite side surfaces, and affixing structures at the bottom surface and spaced apart from each other.

17 Claims, 6 Drawing Sheets

BOTTOM FRAME FOR LIQUID CRYSTAL DISPLAY DEVICE, BACKLIGHT ASSEMBLY AND LIQUID CRYSTAL DISPLAY DEVICE USING THE SAME

The present application claims the benefit of Korean Patent Application No. 2005-0058138 filed in Korea on Jun. 30, 2005, which is hereby incorporated by reference in its entirety.

BACKGROUND OF THE INVENTION

1. Field of the Invention

The present invention relates to backlighting a liquid crystal display device, and more particularly, to a bottom frame for a liquid crystal display (LCD) device, backlight assembly and LCD device using the same. Although the present invention is suitable for a wide scope of applications, it is particularly suitable for providing a space in a backlight assembly to improve durability, assembling characteristics and protection against heat.

2. Discussion of the Related Art

A related art liquid crystal display (LCD) device uses optical anisotropy and polarization properties of liquid crystal molecules. The liquid crystal molecules have a definite alignment direction as a result of their thin and long shapes. The alignment direction of the liquid crystal molecules can be controlled by applying an electric field across the liquid crystal molecules. In other words, as the intensity or direction of the electric field is changed, the alignment of the liquid crystal molecules also changes. Since incident light is refracted based on the orientation of the liquid crystal molecules due to the optical anisotropy of the liquid crystal molecules, images can be displayed by controlling light transmissivity.

The LCD device includes a liquid crystal panel and a backlight assembly. The liquid crystal panel includes two substrates spaced apart and facing each other, and a liquid crystal layer interposed between the two substrates. Each of the substrates has a transparent electrode, and the backlight assembly provides light into the liquid crystal panel from a rear side of the liquid crystal panel. Voltage is applied to each of the transparent electrodes such that an electric field is induced between the transparent electrodes. The alignment of the liquid crystal molecules and transmittance of the light emitted from the backlight assembly are changed by varying the intensity or direction of the electric field. Thus, the LCD device displays images by varying the intensity or direction of the induced electric field.

An active matrix LCD device has been widely used, because the active matrix LCD device has sufficient switching speed to display moving color images. The pixels of an active matrix LCD device are arranged in a matrix. Each of the pixel units include a switching element, such as a thin film transistor. The active matrix LCD device uses the thin film transistor in each of the pixel units as a controller for the pixel unit. The active matrix LCD device can have a backlight assembly that includes a cold cathode fluorescent lamp or an exterior electrode fluorescent lamp as a light source.

Generally, the backlights for LCD devices are divided into side type and direct type depending on the location of the light source relative to the liquid crystal panel. In the side type, a light guide plate is disposed at a rear side of the liquid crystal panel and light is emitted from a light source at a side surface of the liquid crystal panel that is redirected into the liquid crystal panel by the light guide plate. In the direct type, light from a backlight assembly, which is disposed at a rear side of the liquid crystal panel, is supplied directly into the liquid crystal panel from the rear side of the liquid crystal panel. An LCD device having a direct type backlight is widely used in large-sized TVs, computer monitors and so on, because the LCD device having a direct type backlight displays bright images.

FIG. 1 is an exploded perspective view of a liquid crystal display device having a direct type backlight according to the related art. The LCD device includes several elements such as a liquid crystal panel 10, a backlight assembly 20 and mechanical elements. The mechanical elements modularize the LCD device. The liquid crystal panel 10 and the backlight assembly 20 are spaced apart and face each other. A main frame 40, such as a rectangular frame, wraps the side surfaces of the liquid crystal panel 10 and the backlight assembly 20. A bottom frame 50 is combined with the main frame 40 from underneath the backlight assembly 20 so that an exterior of the LCD device is supported and a light loss is prevented. A top frame 60, which wraps around front edge portions of the liquid crystal panel 10, is combined with the main frame 40 and the bottom frame 50 so that the LCD device is packaged as module.

A printed circuit board 12 is disposed on at least one side edge of the liquid crystal panel 10. A driving integrated circuit (not shown) is connected to the printed circuit board 12. The backlight assembly 20 includes a reflecting sheet 22, a plurality of fluorescent lamps 24, a couple of side supports 26 and a plurality of optical sheets 28. The reflecting sheet 22 covers inner sides of the bottom frame 50. The fluorescent lamps 24 are disposed parallel to each other within the reflecting sheet 22. A pair of side supports 26 are provided on opposite sides of the bottom frame 50 to affix the reflecting sheet 22 and the fluorescent lamps 24 to the bottom frame 50. The plurality of optical sheets 28 is disposed at an uppermost portion of the backlight assembly 20. Thus, light emitted from the fluorescent lamps 24 is treated to have a uniform brightness after passing through the plurality of optical sheets 28 such that a planar light is supplied to the liquid crystal panel 10.

A backlight assembly and LCD device using light emitting diode (LED) lamps instead of fluorescent lamps as a light source have been introduced, and the use of LED lamps has several advantages. When an LCD device uses LED lamps as a light source, the LCD device has greater brightness than an LCD device using fluorescent lamps. Thus an LCD device using LED lamps can easily display moving images. Also, because an inverter is not necessary, a driving integrated circuit of a backlight assembly using LED lamps has a simpler structure than a driving integrated circuit for fluorescent lamps.

FIG. 2 is an exploded perspective view of a liquid crystal display device using LED lamps in a backlight according to the related art. A backlight assembly 30 includes LED lamps 33, metal core printed circuit boards (MCPCBs) 32, a reflecting sheet 34, a transparent window 36, and optical sheets 38. The backlight assembly 30 uses the LED lamps 33 as a light source.

The LED lamps 33 are disposed on each of the plurality of MCPCBs 32. The MCPCBs 32 are arranged on an inner surface of a bottom frame 50 and have a stripe shape. As shown in FIG. 2, the MCPCBs 32 are connected together via wires 39 between the MCPCBs 32.

A reflecting sheet 34 covers the plurality of MCPCBs 32 and the inner surfaces of the bottom frame 50. The reflecting sheet 34 has through-holes 35, each of which corresponds to one of the LED lamps 33, respectively. Thus, the LED lamps 33 protrude through the through-holes 35 in the reflecting sheet 34, respectively. The MCPCBs 32 are typically attached to the inner surface of the bottom frame 50 to hold the MCPCBs 32 in position such that the LED lamps 33 are properly positioned to protrude through the reflecting sheet 34.

Optical sheets 38 are disposed over the reflecting sheet 34 and the transparent window 36 is interposed between the optical sheets 38 and the reflecting sheet 34. The transparent window 36 has reflecting dots 37 corresponding to the LED lamps 33, respectively. Light, which is directly emitted from the plurality of LED lamps 33 or reflected by the reflecting sheet 34, is dispersed by the reflecting dots 37 of the transparent window 36 and changed into a planar light source for the liquid crystal panel 10. The LED lamps have outstanding optical properties and structural characteristics. Further, the backlight assembly using LED lamps includes similar mechanical elements as those in the backlight assembly using fluorescent lamps.

In FIG. 1, for example, a couple of side supports 26 not only affix the fluorescent lamps 24 to the bottom frame 50 but also protect a clip socket or a soldering portion by covering the clip socket or the soldering portion, which is a connection between electrodes at the edges of the fluorescent lamps 24 and the driving integrated circuit of the backlight assembly. However, as shown in FIG. 2, the couple of side supports 26 only aid in defining a space, in which the LED lamps are disposed on the bottom frame 50. Although the LED lamps radiate heat during operation, the bottom frame according to the related art in FIG. 2 does not have a provision for heat release or heat removal. Further, the MCPCBs 32 in the related art shown in FIG. 2 are difficult to replace because a defective MCPCB 32 has to be detached from the inner surface of the bottom frame 50 and the wires 39, and then a new MCPCB 32 has to be properly positioned, attached to the inner surface of the bottom frame 50 and rewired. Further, since the additional element of a transparent window interposed between the LED lamps and the plurality of optical sheets is required, the process of fabricating an LCD device with a backlight using LED lamps is more complicated than a LCD device with a backlight using fluorescent lamps.

SUMMARY OF THE INVENTION

Accordingly, the present invention is directed to a bottom frame, a backlight assembly and an LCD device using the same that substantially obviate one or more of the problems due to limitations and disadvantages of the related art.

An object of the present invention is to provide an LCD device including a bottom frame and a backlight assembly using LED lamps having a simpler fabrication process.

An object of the present invention is to provide an LCD device including a bottom frame and a backlight assembly using LED lamps having an improved durability without increased complexity in the fabrication process.

Another object of the present invention is to provide an LCD device including a bottom frame and a backlight assembly using LED lamps having an improved durability without increasing production cost.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a bottom frame for a liquid crystal display device includes a bottom surface, four side surfaces attached to the bottom surface, the four side surfaces along with the bottom surface define a space, first and second holes in two side surfaces, the first and second holes opposite to each other in two opposite side surfaces, and affixing structures at the bottom surface and spaced apart from each other.

In another aspect of the present invention, a backlight assembly for liquid crystal display device has a bottom frame including: a bottom surface; four side surfaces attached to the bottom surface, the four side surfaces together with the bottom surface define a space; first and second of holes in two of the four side surfaces, the first and second holes opposite to each other in two opposite side surfaces; and affixing structures at the bottom surface and spaced apart from each other, and printed circuit boards on the bottom frame and spaced apart from each other, each of the printed circuit boards having a stripe shape and ends of the printed circuit boards inserted into the holes in the two opposite side surfaces, a plurality of light emitting diode lamps on each of the printed circuit boards, and a reflecting sheet covering the bottom surface and the printed circuit boards, the reflecting sheet having a plurality of through-holes corresponding to the light emitting diode lamps.

In another aspect of the present invention, a liquid crystal display device has a backlight assembly with a bottom frame including: a bottom surface; four side surfaces attached to the bottom surface, the four side surfaces together with the bottom surface define a space; first and second holes on the four side surfaces, the first and second holes opposite to each other; and at least two protrusions extending from the four side surfaces to the space, the protrusions are at a level higher from the bottom surface than the first and second holes, and printed circuit boards on the bottom frame and spaced apart from each other, each of the printed circuit boards having a stripe shape and both ends of each of the printed circuit boards are inserted through the first and second holes at the two opposite side surfaces, respectively, a plurality of light emitting diode lamps on each of the printed circuit boards, a reflecting sheet covering the bottom surface and the printed circuit boards, the reflecting sheet having through-holes corresponding to the light emitting diode lamps, a transparent window over the protrusion and spaced apart from the light emitting diode lamps, the transparent window having diverters corresponding to the light emitting diode lamps, optical sheets disposed over the four side surfaces, a liquid crystal panel on the plurality of optical sheets, a main frame surrounding the liquid crystal panel and the bottom frame, and a top frame surrounding a front edge of the liquid crystal panel.

In another aspect, a backlight assembly for liquid crystal display device has a bottom frame including: a bottom surface; four side surfaces attached to the bottom surface, the four side surfaces together with the bottom surface define a space; and first and second of holes in two of the four side surfaces, the first and second holes opposite to each other in two opposite side surfaces, and printed circuit boards on the bottom frame and spaced apart from each other, each of the printed circuit boards having a stripe shape and ends of the printed circuit boards inserted into the holes in the two opposite side surfaces, and connectors attached to at least one end of each of the printed circuit boards for providing power to the printed circuit boards.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments, examples of which are illustrated in FIGS. 3 to 6.

Figure 1:
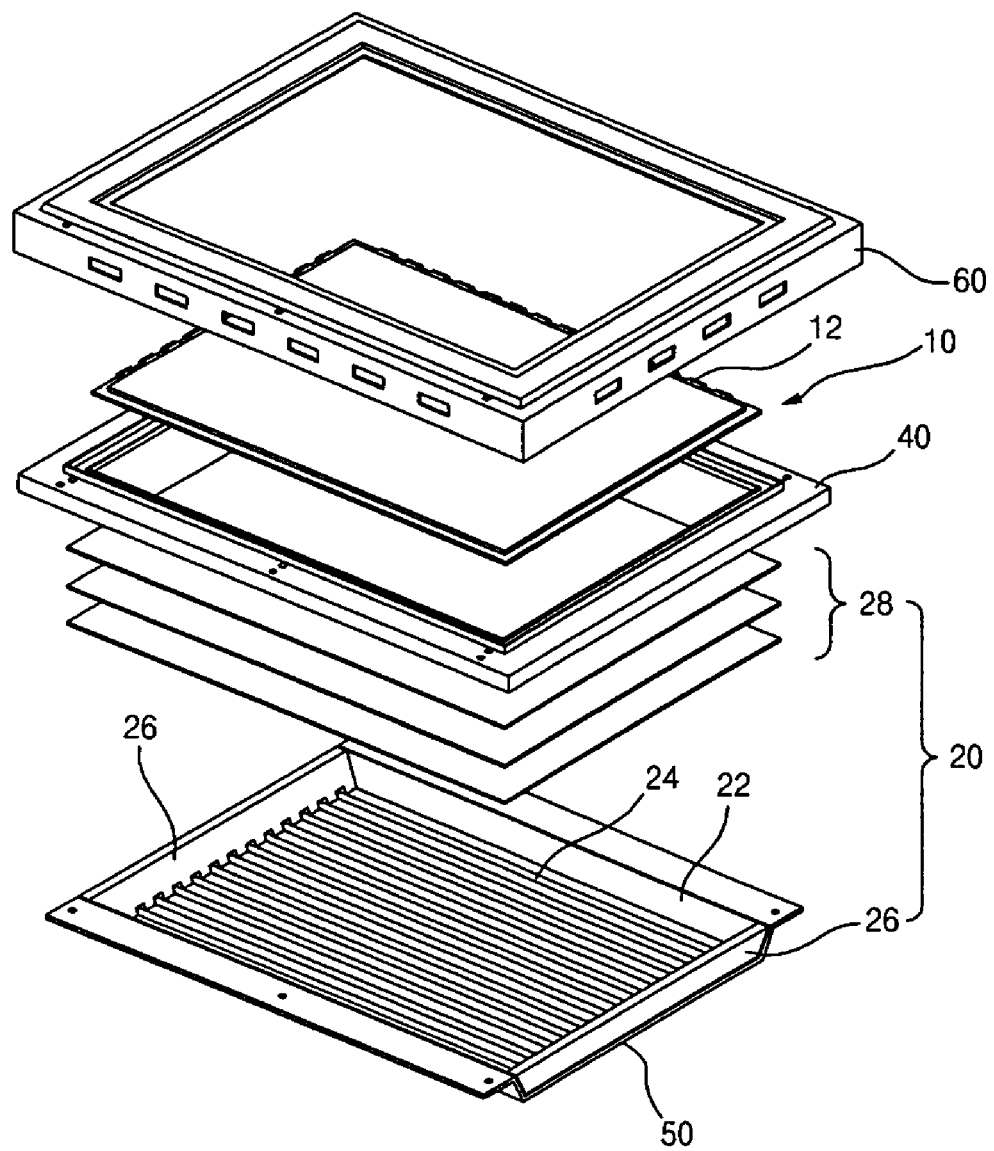
FIG. 1 is an exploded perspective view of a liquid crystal display device having a direct type backlight according to the related art.
Figure 2:
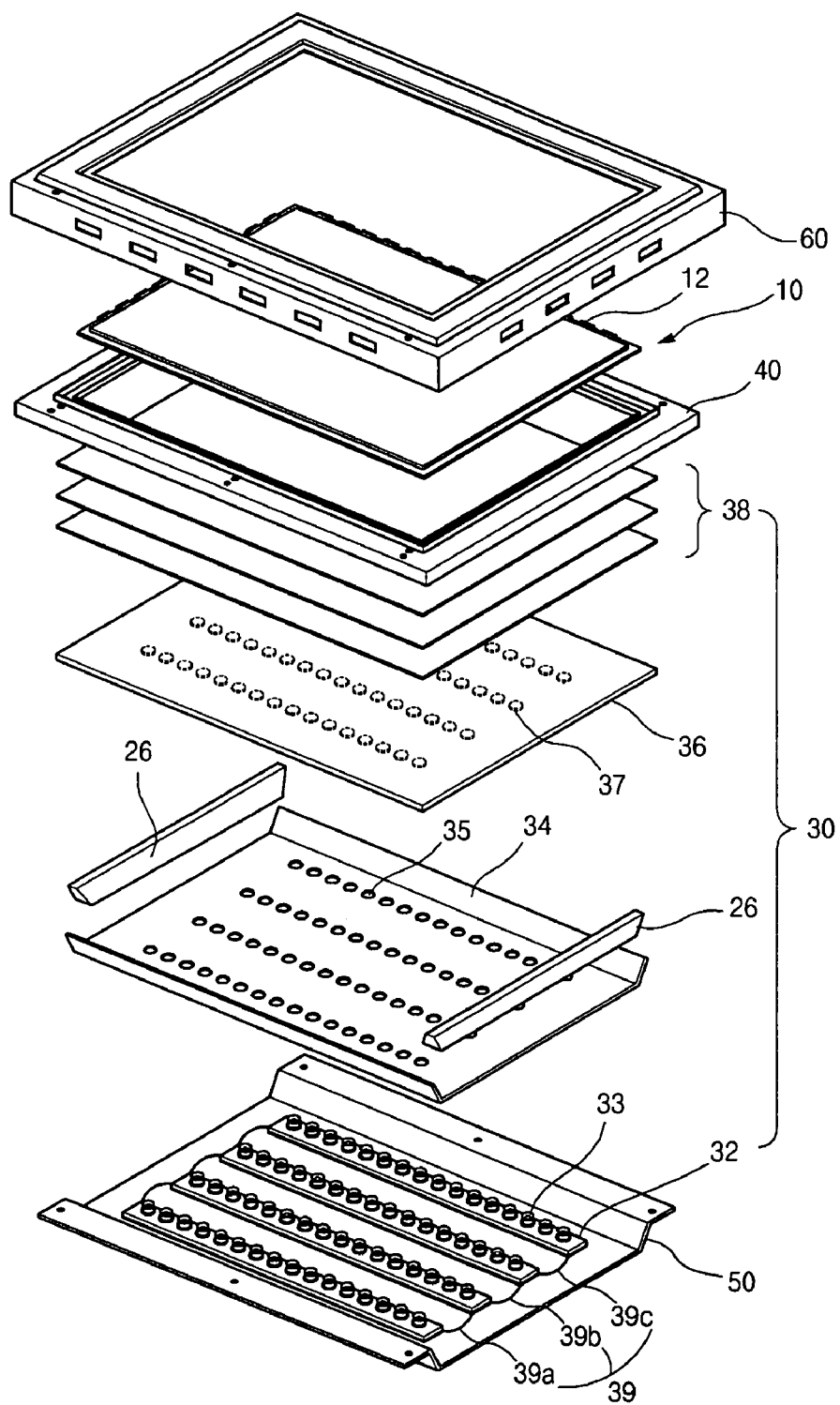
FIG. 2 is an exploded perspective view of a liquid crystal display device using LED lamps in a backlight according to the related art.
Figure 3:
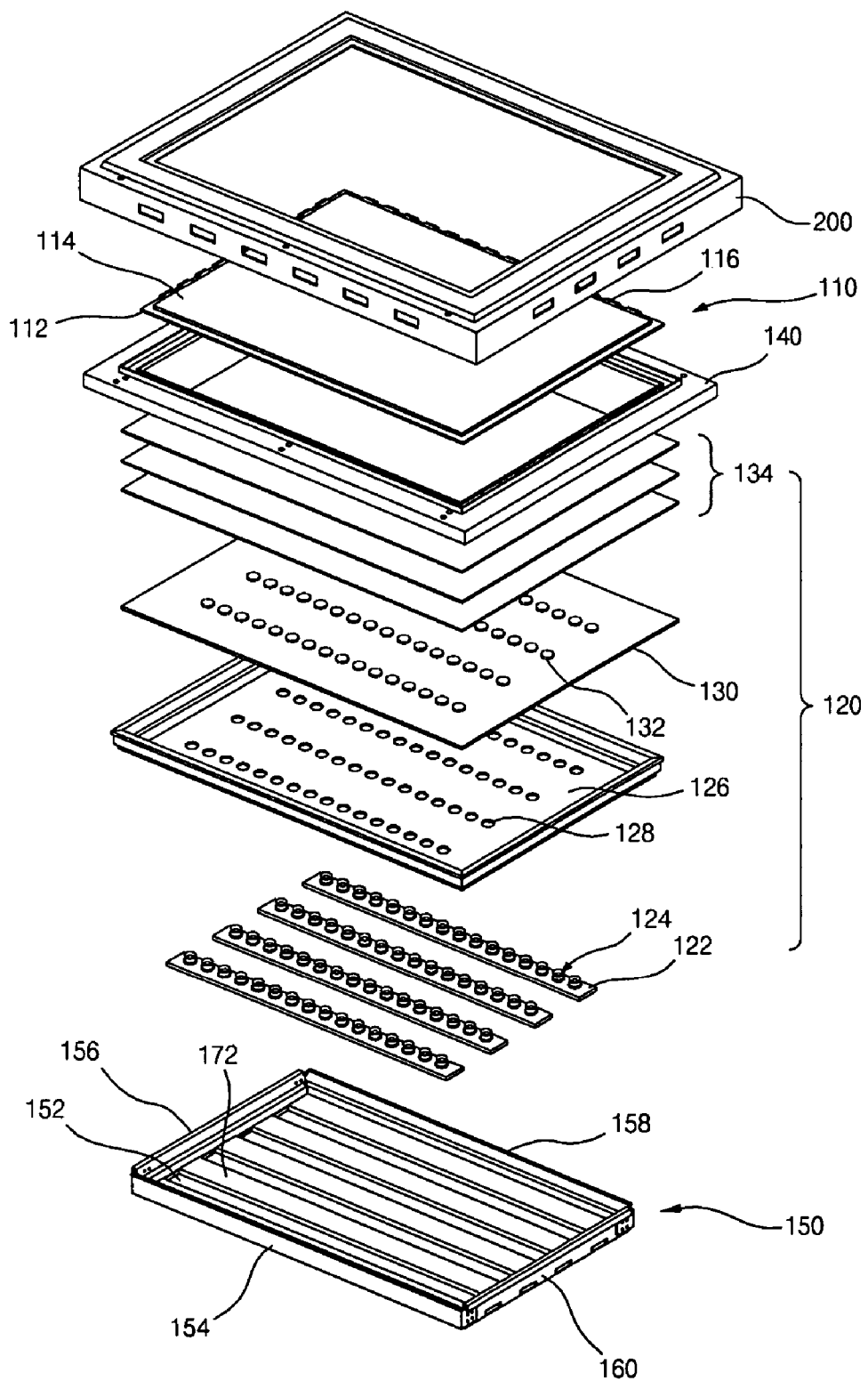
FIG. 3 is an exploded perspective view of an LCD device using LED lamps in a backlight according to a first embodiment of the present invention.

FIG. 3 is an exploded perspective view of an LCD device using LED lamps in a backlight according to a first embodiment of the present invention. As shown in FIG. 3, the LCD device includes a liquid crystal panel 110, an LED backlight assembly 120, a main frame 140, a bottom frame 150 and a top frame 200. The main frame 140, made of stainless steel or resin, wraps the sides of the liquid crystal panel 110 and the LED backlight assembly 120. The bottom frame 150 envelops the LED backlight assembly 120 up to a rear surface of the liquid crystal panel 110 and is combined with the main frame 140 to maintain a shape of the LCD device and minimize light loss. The top frame 200 wraps around front edges of the liquid crystal panel 110 and is combined with the bottom frame 150 to package the LCD device as a module.

The liquid crystal panel 110 includes first and second substrates 112 and 114, which are spaced apart and facing each other, and a liquid crystal layer (not shown) is interposed therebetween. When the LCD device is an active matrix type, the first substrate 112, referred to as a lower substrate or an array substrate, includes a plurality of gate lines and data lines (not shown) crossing each other to define pixel regions. A thin film transistor (not shown) corresponding to a transparent pixel electrode (not shown) is disposed in each of the pixel regions adjacent to the crossing of a gate line and a data line. The second substrate 114, referred to as an upper substrate or a color filter substrate, includes a color filter (not shown), a black matrix (not shown) and a transparent common electrode (not shown).

A conductive connecting element 116, such as a flexible printed circuit board and tape carrier package (TCP), is disposed adjacent at least one edge of the liquid crystal panel 110 to connect the liquid crystal panel 110 to a driving integrated circuit (not shown). The driving integrated circuit includes a gate driving circuit and a data driving circuit adjacent to edges of the liquid crystal panel 110. The gate driving circuit sends signals to each of the gate lines to control the thin film transistors. The data driving circuit sends data signals to each of the data lines to display images. When the gate line is selected by the gate driving circuit and the data signal voltage from the data driving circuit is applied to a pixel electrode through the data line, an electric field is induced between the pixel electrode and the common electrode. Accordingly, alignment directions of the liquid crystal molecules in the liquid crystal panel 110 are changed by the electric field, and thus transmittance of light corresponding to the data signal voltage occurs. More specifically, since the LCD device according to embodiments of the present invention includes the LED backlight assembly 120, images are displayed by the transmittance of light from the LEDs through the pixels in correspondence with the data signal voltages from the data driving circuits.

The LED backlight assembly 120 includes MCPCBs 122, LED lamps 124, a reflecting sheet 126, a transparent window 130 and a plurality of optical sheets 134. The MCPCBs 122 are arranged on inner surface of the bottom frame 150. Further, the MCPCBs 122 have a stripe shape. A plurality of LED lamps 124 are disposed on each of the MCPCBs 122. The LED lamps 124 can be either side-emitting or top-emitting LEDs. The reflecting sheet 126 covers an inner surface of the bottom frame 150 and the MCPCBs 122. The reflecting sheet 126 has a through-holes 128 corresponding to the LED lamps 124, respectively. Further, the LED lamps 124 protrude through the through-holes 128 in the reflecting sheet 126, respectively.

The optical sheets 134 are disposed over the reflecting sheet 126. The transparent window 130 is interposed between the reflecting sheet 126 and the optical sheets 134 and has a plurality of reflecting dots or diverters 132 corresponding to the LED lamps 124, respectively. Accordingly, light, which is directly emitted from each of the LED lamps 124 or reflected from the reflecting sheet 126, is dispersed by the diverters 132 of the transparent window 130 such that the LED backlight assembly 120 provides a planar light source to the liquid crystal panel 110.

The bottom frame 150 has a bottom surface 152, on which the MCPCBs 122 and the LED lamps 124 are disposed within an inner space of the LED backlight assembly 120. The inner space is defined by the bottom surface 152 and four side surfaces 154, 156, 158 and 160. In other words, the inner space has a box shape with an opened upper surface. The four side surfaces 154, 156, 158 and 160 are attached to the bottom surface 152, respectively, and the four side surfaces 154, 156, 158 and 160 are combined to form the side surfaces of the LED backlight assembly 120. Hereinafter, the bottom frame 150 according to an exemplary embodiment of the present invention is explained in more detail with reference to FIGS. 4 and 5.

Figure 4:
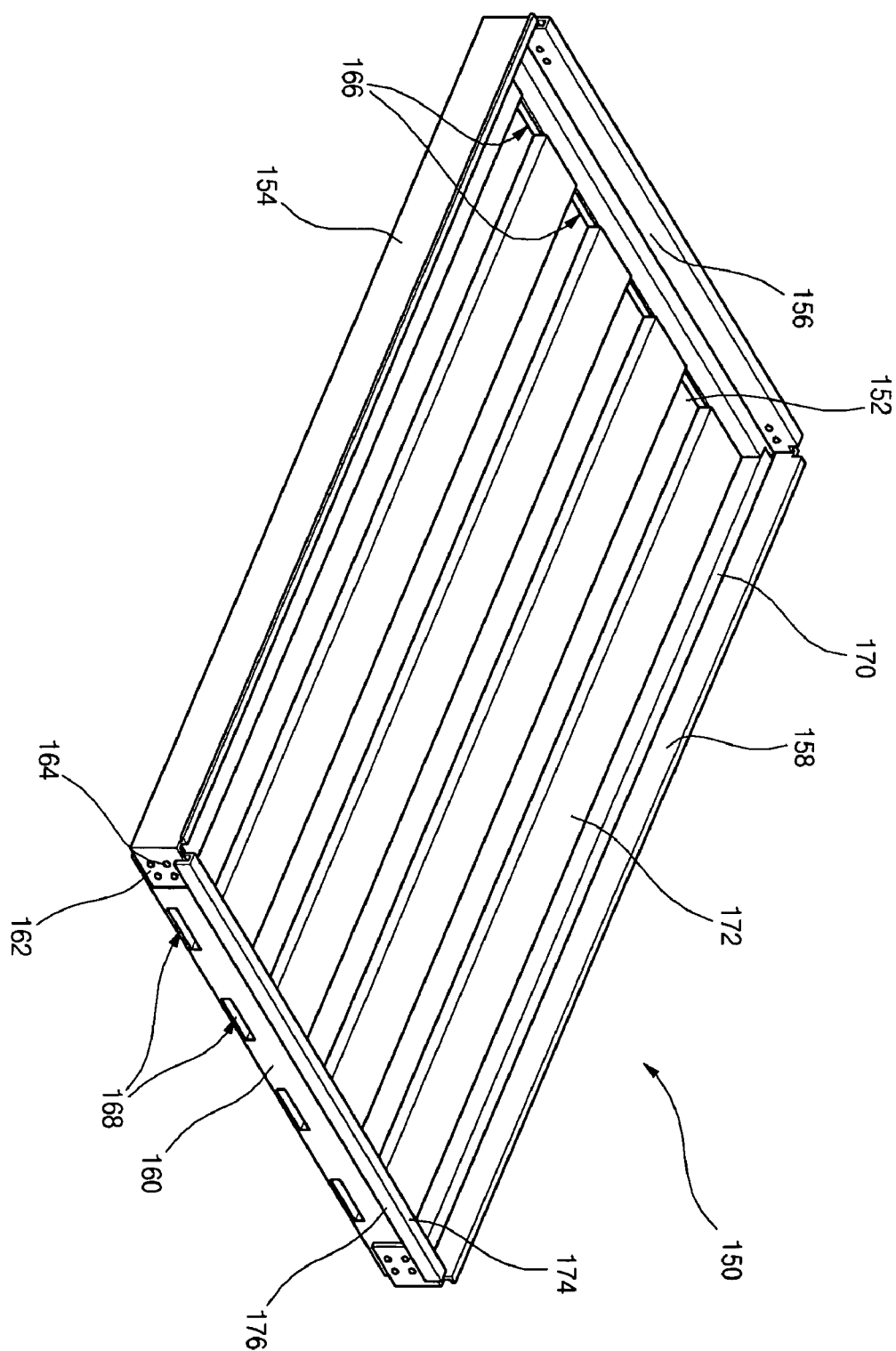
FIG. 4 is an enlarged perspective view of a bottom frame shown in FIG. 3.

FIG. 4 is an enlarged perspective view of a bottom frame shown in FIG. 3. As shown in FIG. 4, the bottom frame 150 includes the bottom surface 152 and first to fourth side surfaces 154, 156, 158 and 160. The bottom frame 150 is made of metal, such as aluminum. The four side surfaces 154, 156, 158 and 160 are attached to the bottom surface 152. The two side surfaces 156 and 160 facing each other have joint units 162, and the joint units 162 extend from the edges of the other side surfaces 154 and 158. Accordingly, each of the four side surfaces 154, 156, 158 and 160 are combined to an adjacent side surface through the joint unit 162 with a combining mechanism 164, such as a rivet, and then the bottom frame 150 has a box shape with an open upper surface. In the alternative, each of the four side surfaces 154, 156, 158 and 160 can include a joint unit 162 for combining the four side surfaces with a combining mechanism 164, such as a rivet.

Figure 5:
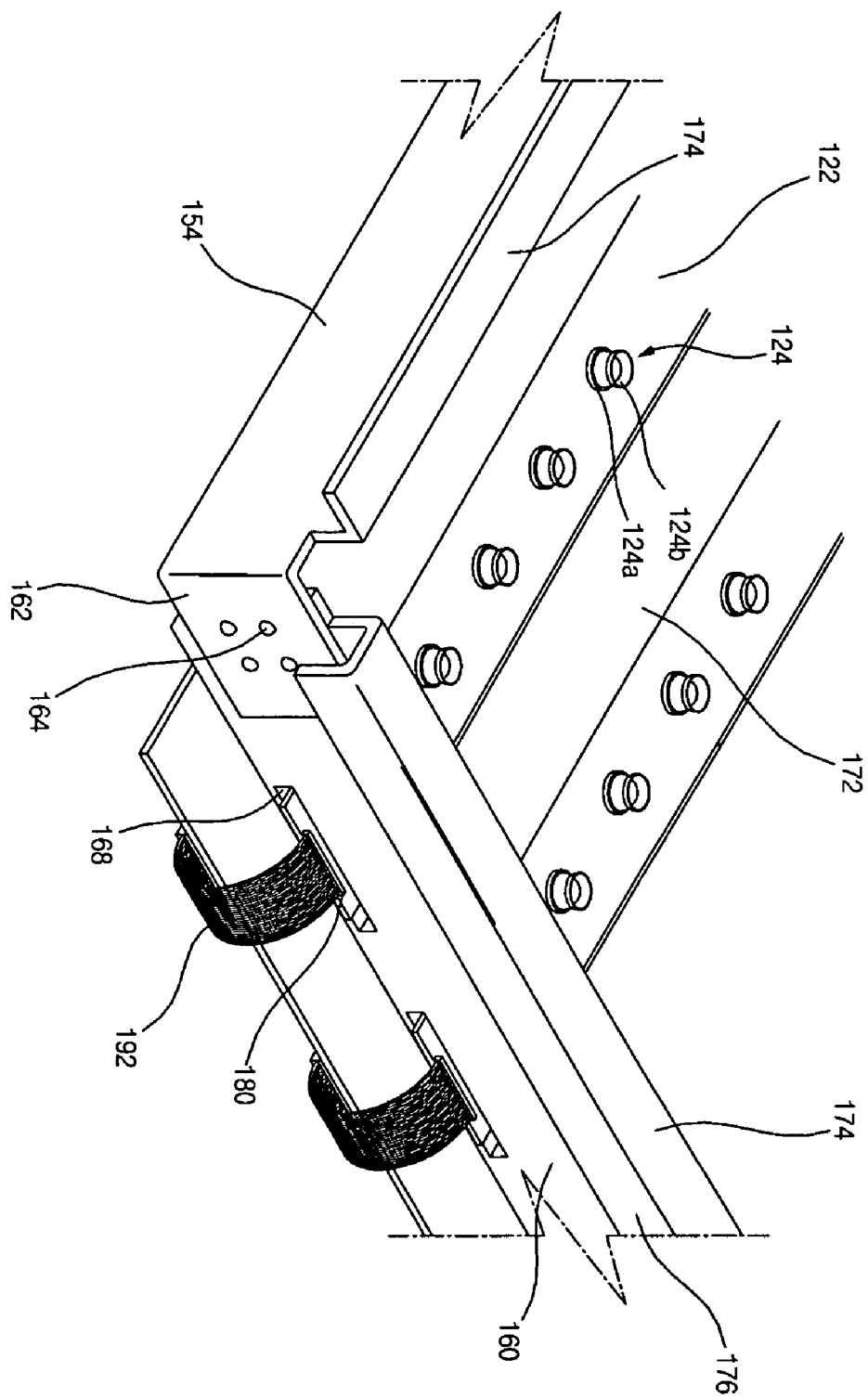
FIG. 5 is a further enlarged perspective view of a part of bottom frame shown in FIG. 4.

FIG. 5 is a further enlarged perspective view of a part of the bottom frame shown in FIG. 4. In an exemplary second embodiment according to the present invention, the bottom surface 152 has a rectangular shape. Second and fourth side surfaces 156 and 160, along the minor axis of the LED backlight assembly 120, have a plurality of first and second holes 166 and 168 facing each other, respectively. The plurality of first and second holes 166 and 168 are formed in a lower portion of the second and fourth side surfaces 156 and 160, respectively. Any two side surfaces, facing each other, or all side surfaces include a protrusion 170, which has a bar shape and protrudes from the two or four side surfaces into the space of the bottom frame 150. The protrusion 170 is formed at a level higher from the bottom surface 152 than the first and second holes 166 and 168. As shown in FIG. 5, the MCPCBs 122 protrude from the first and second holes 166 and 168. The first and second holes 166 and 168 are formed at opposite side surfaces, and ends of the MCPCBs 122 are inserted through the first and second holes 166 and 168. The first and second holes 166 and 168 are bigger than the ends of the MCPCBs 122, so that air can be introduced into the inner space within the bottom frame 150 to reduce the temperature of the inner space within the bottom frame 150. More specifically, a cross-sectional area of each the first and second holes 166 and 168 is larger than a cross-sectional area of each end of the MCPCBs 122.

The protrusion 170 supports the transparent window 130. The protrusion 170 may be formed by affixing a bar shaped element to at least two opposing side surfaces of the four side surfaces 154, 156, 158 and 160. In another embodiment of the present invention, the protrusion 170 is formed by sequentially bending at least two opposing side surfaces outward and upward, or by sequentially bending the side surface inward, upward and outward. Accordingly, edges of the transparent window 130 are supported by the protrusion 170 so as to be spaced apart from the LED lamps 124.

Affixing structures 172, having a stripe shape and spaced apart from each other, are formed on the bottom surface 152. The affixing structures 172 are disposed between the adjacent holes 166 and 168 in the second and fourth side surfaces 156 and 160, along the minor axis of the LED backlight assembly 120. Both ends of the affixing structures 172 protrude through the opposite second and fourth side surfaces 156 and 160, respectively, which have a plurality holes 166 and 168. Further, the affixing structures 172 can be attached to the bottom frame 150 to prevent the bottom frame 150 from being distorted by an impact, and thus the bottom frame 150 has an improved durability.

The MCPCBs 122 are disposed between two adjacent affixing structures 172 such that the MCPCBs 122 are positioned by adjacent affixing structures 172. The MCPCBs 122 can slid in between two adjacent affixing structures 172 through one of the adjacent holes 166 and 168. Further, the affixing structures 172 can form a recess with edges overlapping the MCPCBs 122 to prevent the MCPCBs 122 from being separated from the bottom frame 150.

The reflecting sheet 126 uniformly covers the MCPCBs 122 and the affixing structures 172. The LED lamp 124 has a bottom portion 124a and a lens portion 124b. The bottom portion 124a is attached to the MCPCBs 122 and the lens portion 124b of the LEDs lamps 124 protrudes from the MCPCBs 122. The bottom portion 124a and the lens portion 124b may both have a pipe shape. The bottom portion 124a can have a larger diameter than that of the lens portion 124b. The affixing structures 172 have substantially the same height as the bottom portion 124a of the LED lamps 124 in the MCPCBs 122 above the bottom surface 152 of the bottom frame 150.

The reflecting sheet 126 is uniformly disposed about the periphery of the bottom portion 124a and on the affixing structures 172. The reflecting sheet 126 covers all of the MCPCBs 122, the plurality of affixing structures 172 and the four side surfaces 152, 156, 158 and 160, except the LED lamps 124, so that reflecting yield of the reflecting sheet 126 is large. A portion of the reflecting sheet 126, which adheres to the four side surfaces 152, 156, 158 and 160 of the bottom frame 150, has the substantially same shape as the four side surfaces 152, 156, 158 and 160 of the bottom frame 150. The transparent window 130 is supported by the protrusion 170.

As shown in FIGS. 4 and 5, a top of the two side surfaces 156 and 160 extends outward so that a horizontal portion 174 is formed. A top of the side surfaces 156 and 160 may be bent outward and downward so that the horizontal portion 174 and a joint portion 176, which are perpendicular each other, are formed. The horizontal portion 174 substantially supports the optical sheets 134. The top surfaces or horizontal portions 174 of the four side surfaces 154, 156, 158 and 160 are even with one another. The bottom frame 150 is combined with the main frame 140 using the joint portion 176.

As mentioned above, the bottom frame 150 has the plurality of holes 166 and 168, and ends of the MCPCBs 122 are inserted into the holes 166 and 168 and affixed to the bottom frame 150 while the ends of the MCPCBs 122 protrude through the holes 166 and 168. As shown in FIG. 5, a connector 180 is formed on at least one end of each of the MCPCBs 122. The connector 180 is connected to a connecting line 192. The connecting line 192 is connected to a backlight driving integrated circuit (not shown) in the rear surface of the bottom frame 150, and thus the MCPCBs 122 are connected to the backlight driving integrated circuit through the connector 180 and the connecting line 192.

The affixing structures 172 are disposed and affixed to the bottom surface of the bottom frame 150 and separated from each other. In the alternative, the bottom surface can be corrugated to integrally form the affixing structures 172. When the bottom surface of the bottom frame 150 has a rectangular shape, the plurality of affixing structures 172 are disposed and affixed along the major axis of the bottom frame 150. Then, the MCPCBs 122 are disposed between the affixing structures 172. Both ends of the MCPCBs 122 are inserted through the first and second holes 166 and 168. The first and second holes 166 and 168 are formed in the second and fourth side surface 156 and 160, which are formed along the minor axis of the bottom frame 150. One or both ends of the MCPCBs 122 extends outside of the inner space defined by the bottom surface 152 and four side surfaces 154, 156, 158 and 160. An end of the MCPCBs 122, which extends outside of the inner space, is connected to the backlight driving integrated circuit through the connector 180 and the connecting line 192.

The reflecting sheet 126 having the through-holes 128 corresponding to the LED lamps 124, respectively, covers the MCPCBs 122 and the affixing structures 172. The LED lamps 124 protrude through the through-holes 128 of the reflecting sheet 126. The transparent window 138 is disposed on the protrusion 170, which is formed protruding from the four side surfaces 154, 156, 158 and 160 inward toward the inner space of the bottom frame 150, and spaced apart from the LED lamps 124. The optical sheets 134 are disposed on the horizontal portion 174 of the four side surfaces 154, 156, 158 and 160 above the transparent window 130. The optical sheets 134 may include a diffusion plate. Next, the main frame 140 is disposed on the optical sheets 134 and combined with the bottom frame 150 through the joint portion 176 at the four side surfaces 154, 156, 158 and 160. The liquid crystal panel 110 is disposed on the main frame 140, and the top frame 200 is disposed on the liquid crystal panel 110 to support the edges of the liquid crystal panel 110, and then the process of modularizing the LCD device according to embodiments of the present invention is finished.

The MCPCBs 122 can be configured such that the width of the first and second through holes 166 and 168 is greater than the width of the MCPCBs 122. Thus, a MCPCB 122 can be slid in and out of the inner space of the bottom frame 150 through one of the first and second through holes 166 and 168. For example, a defective MCPCB 122 can be replaced by disconnecting the connector to the defective MCPCB, sliding the defective MCPCB 122 out of the inner space of the bottom frame 150 through one of the first and second through holes 166 and 168, sliding a new MCPCB 122 into the inner space of the bottom frame 150 through one of the first and second through holes 166 and 168, and then connecting the connector to the new MCPCB 122.

Figure 6:
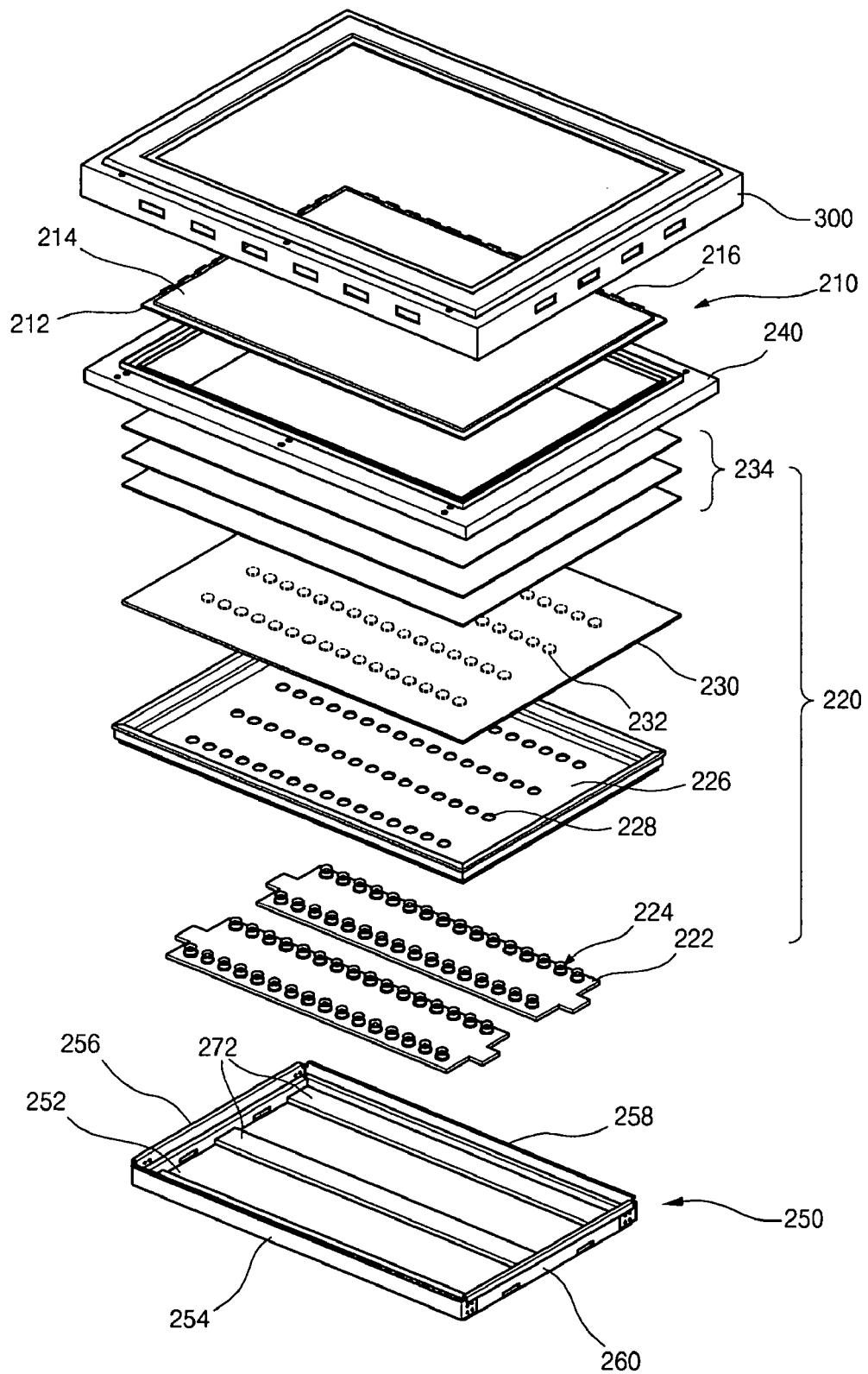
FIG. 6 is an exploded perspective view of an LCD device using LED lamps in a backlight according to a second embodiment of the present invention.

FIG. 6 is an exploded perspective view of an LCD device using LED lamps in a backlight according to a second embodiment of the present invention. As shown in FIG. 6, the LCD device includes a liquid crystal panel 210, an LED backlight assembly 220, a main frame 240, a bottom frame 250 and a top frame 300. The main frame 240, made of stainless steel or resin, wraps the sides of the liquid crystal panel 210 and the LED backlight assembly 220. The bottom frame 250 envelops the LED backlight assembly 220 up to a rear surface of the liquid crystal panel 210 and is combined with the main frame 240 to maintain a shape of the LCD device and minimize light loss. The top frame 300 wraps around front edges of the liquid crystal panel 210 and is combined with the bottom frame 250 to package the LCD device as a module.

The liquid crystal panel 210 includes first and second substrates 212 and 214, which are spaced apart and facing each other, and a liquid crystal layer (not shown) is interposed therebetween. When the LCD device is an active matrix type, the first substrate 212, referred to as a lower substrate or an array substrate, includes a plurality of gate lines and data lines (not shown) crossing each other to define pixel regions. A thin film transistor (not shown) corresponding to a transparent pixel electrode (not shown) is disposed in each of the pixel regions adjacent to the crossing of a gate line and a data line. The second substrate 214, referred to as an upper substrate or a color filter substrate, includes a color filter (not shown), a black matrix (not shown) and a transparent common electrode (not shown).

A conductive connecting element 216, such as a flexible printed circuit board and tape carrier package (TCP), is disposed adjacent at least one edge of the liquid crystal panel 210 to connect the liquid crystal panel 210 to a driving integrated circuit (not shown). The driving integrated circuit includes a gate driving circuit and a data driving circuit adjacent to edges of the liquid crystal panel 210. The gate driving circuit sends signals to each of the gate lines to control the thin film transistors. The data driving circuit sends data signals to each of the data lines to display images. When the gate line is selected by the gate driving circuit and the data signal voltage from the data driving circuit is applied to a pixel electrode through the data line, an electric field is induced between the pixel electrode and the common electrode. Accordingly, alignment directions of the liquid crystal molecules in the liquid crystal panel 210 are changed by the electric field, and thus transmittance of light corresponding to the data signal voltage occurs. More specifically, since the LCD device according to embodiments of the present invention includes the LED backlight assembly 220, images are displayed by the transmittance of light from the LEDs through the pixels in correspondence with the data signal voltages from the data driving circuits.

The LED backlight assembly 220 includes MCPCBs 222, LED lamps 224, a reflecting sheet 226, a transparent window 230 and a plurality of optical sheets 234. The MCPCBs 222 are arranged on inner surface of the bottom frame 250. Further, the MCPCBs 222 have a stripe shape. At least two rows of LED lamps 224 are disposed on each of the MCPCBs 222. The LED lamps 224 can be either side-emitting or top-emitting LEDs. The reflecting sheet 226 covers an inner surface of the bottom frame 250 and the MCPCBs 222. The reflecting sheet 226 has a through-holes 228 corresponding to the LED lamps 224, respectively. Further, the LED lamps 224 protrude through the through-holes 228 in the reflecting sheet 226, respectively.

The optical sheets 234 are disposed over the reflecting sheet 226. The transparent window 230 is interposed between the reflecting sheet 226 and the optical sheets 234 and has a plurality of reflecting dots or diverters 232 corresponding to the LED lamps 224, respectively. Accordingly, light, which is directly emitted from each of the LED lamps 224 or reflected from the reflecting sheet 226, is dispersed by the diverters 232 of the transparent window 130 such that the LED backlight assembly 220 provides a planar light source to the liquid crystal panel 210.

The bottom frame 250 has a bottom surface 252, on which the MCPCBs 222 and the LED lamps 224 are disposed within an inner space of the LED backlight assembly 220. The inner space is defined by the bottom surface 252 and four side surfaces 254, 256, 258 and 260. In other words, the inner space has a box shape with an opened upper surface. The four side surfaces 254, 256, 258 and 260 are attached to the bottom surface 252, respectively, and the four side surfaces 254, 256, 258 and 260 are combined to form the side surfaces of the LED backlight assembly 220.

Affixing structures 272, having a stripe shape and spaced apart from each other, are formed on the bottom surface 252. Both ends of the affixing structures 272 protrude through the opposite second and fourth side surfaces 256 and 260, respectively. Further, the affixing structures 272 can be attached to the bottom frame 250 to prevent the bottom frame 250 from being distorted by an impact, and thus the bottom frame 250 has an improved durability. The MCPCBs 222 are disposed between two adjacent affixing structures 272 such that the MCPCBs 222 are positioned by adjacent affixing structures 272.

It will be apparent to those skilled in the art that various modifications and variations can be made in the substrate for the liquid crystal display device and the method of fabricating the same of the present invention without departing from the sprit or scope of the invention. Thus, it is intended that the present invention covers the modifications and variations of this invention provided they come within the scope of the appended claims and their equivalents.

What is claimed is:

1. A backlight assembly for liquid crystal display device, comprising:
   a bottom frame including:
   a bottom surface;
   four side surfaces attached to the bottom surface, the four side surfaces together with the bottom surface define a space;
   first and second of holes in two of the four side surfaces, the first and second holes opposite to each other in two opposite side surfaces; and affixing structures at the bottom surface and spaced apart from each other; and printed circuit boards on the bottom frame and spaced apart from each other, each of the printed circuit boards having a stripe shape and ends of the printed circuit boards inserted into the first and second holes in the two opposite side surfaces;

a plurality of light emitting diode lamps on each of the printed circuit boards; and a reflecting sheet covering the bottom surface and the printed circuit boards, the reflecting sheet having a plurality of through-holes corresponding to the light emitting diode lamps, wherein a width of each of the printed circuit boards substantially corresponds to a distance between two adjacent affixing structures, wherein the affixing structures and the printed circuit boards form a flat top surface, wherein a size of each of the first and second holes is smaller than a size of each of the two opposite side surfaces, and wherein a circumference of each of the first and second holes is completely surrounded by the two opposite side surfaces.

2. The backlight assembly according to claim 1, further comprising:

a transparent window spaced apart from the light emitting diode lamps, the transparent window having diverters corresponding to the light emitting diode lamps; and optical sheets on the transparent window, a periphery of the optical sheets disposed over top of the four side surfaces.

3. The backlight assembly according to claim 1, further comprising four joint units combining the four side surfaces using a plurality of combining mechanisms.

4. The backlight assembly according to claim 3, wherein the four joint units are on two side surfaces opposite to each other and extend from two other side surfaces for combining the four side surface with rivets.

5. The backlight assembly according to claim 3, wherein each of the four side surfaces includes a joint unit for combining the four side surfaces with rivets.

6. The backlight assembly according to claim 1, wherein the four side surfaces have top surfaces even with each other.

7. The backlight assembly according to claim 1, wherein the affixing structures are corrugations of the bottom surface.

8. The backlight assembly according to claim 1, wherein each of the affixing structures is connected between the two opposite side surfaces having the first and second holes, and the affixing structures are alternately arranged with the printed circuit boards.

9. The backlight assembly according to claim 1, wherein each of the light emitting diode lamps includes a bottom portion attached to one of the printed circuit boards and a lens portion that protrudes from the printed circuit boards.

10. The backlight assembly according to claim 9, wherein the affixing structures have substantially the same height as the bottom portion of the light emitting diode lamps above the bottom surface of the bottom frame.

11. The backlight assembly according to claim 1, wherein a cross-sectional area of each the first and second holes is larger than a cross-sectional area of each end of the printed circuit boards.

12. The backlight assembly according to claim 1, wherein the printed circuit boards are metal core printed circuit boards.

13. The backlight assembly according to claim 1, wherein each of the printed circuit boards includes at least two rows of light emitting diode lamps.

14. A liquid crystal display device, comprising:
a backlight assembly including:
a bottom frame including:
a bottom surface;
four side surfaces attached to the bottom surface, the four side surfaces together with the bottom surface define a space;
first and second holes on the four side surfaces, the first and second holes opposite to each other;
a plurality of affixing structures at the bottom surface between the two opposite side surfaces having the first and second holes; and
at least two protrusions extending from the four side surfaces to the space, the protrusions are at a level higher from the bottom surface than the first and second holes; and
printed circuit boards on the bottom frame and spaced apart from each other, each of the printed circuit boards having a stripe shape and both ends of each of the printed circuit boards are inserted through the first and second holes at the two opposite side surfaces, respectively;
a plurality of light emitting diode lamps on each of the printed circuit boards;
a reflecting sheet covering the bottom surface and the printed circuit boards, the reflecting sheet having through-holes corresponding to the light emitting diode lamps;
a transparent window over the protrusion and spaced apart from the light emitting diode lamps, the transparent window having diverters corresponding to the light emitting diode lamps;
optical sheets disposed over the four side surfaces;
a liquid crystal panel on the plurality of optical sheets;
a main frame surrounding the liquid crystal panel and the bottom frame; and
a top frame surrounding a front edge of the liquid crystal panel,
wherein a width of each of the printed circuit boards substantially corresponds to a distance between two adjacent affixing structures,
wherein the affixing structures are alternately arranged with the printed circuit boards, and wherein the affixing structures and the printed circuit boards form a flat top surface, wherein a size of each of the first and second holes is smaller than a size of each of the two opposite side surfaces, and wherein a circumference of each of the first and second holes is completely surrounded by the two opposite side surfaces.

15. The backlight assembly according to claim 14, wherein the printed circuit boards include at least two rows of light emitting diode lamps.

16. A backlight assembly for liquid crystal display device, comprising:
a bottom frame including:
a bottom surface;
four side surfaces attached to the bottom surface, the four side surfaces together with the bottom surface define a space; and
first and second of holes in two of the four side surfaces, the first and second holes opposite to each other in two opposite side surfaces; and
printed circuit boards on the bottom frame and spaced apart from each other, each of the printed circuit boards having a stripe shape and ends of the printed circuit boards inserted into the first and second holes in the two opposite side surfaces; and connectors attached to at least one end of each of the printed circuit boards for providing power to the printed circuit boards, wherein each of the printed circuit board has a center portion and end portions having a smaller width then the center portion and includes at least two rows of light emitting diode lamps, wherein each of the first and second holes has substantially the same width as each end portion, wherein a size of each of the first and second holes is smaller than a size of each of the two opposite side surfaces, and wherein a circumference of each of the first and second holes is completely surrounded by the two opposite side surfaces.

17. The backlight assembly according to claim 16, wherein the at least one end of each the printed circuit boards is inserted into one of the first and second holes so as to extend out of the space.

* * * * *